R. H. PRIOR.
COTTON SEED PLANTER.
APPLICATION FILED SEPT. 14, 1911.
1,044,082.
Patented Nov. 12, 1912.
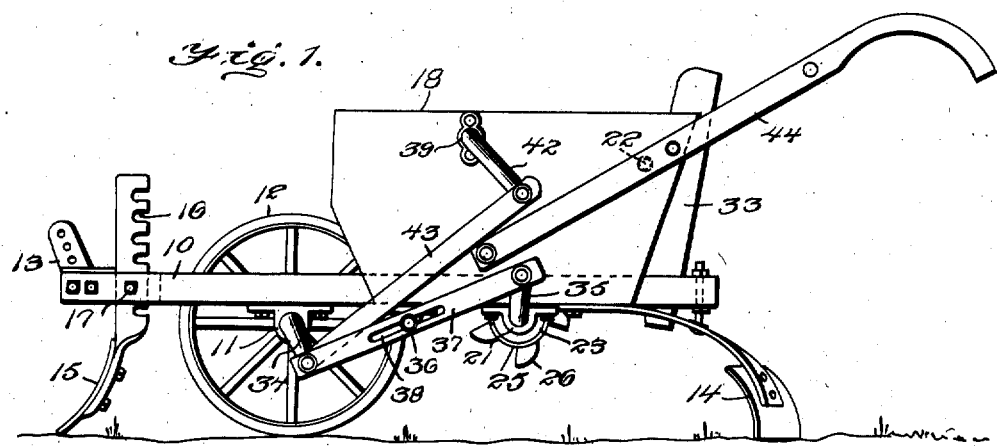
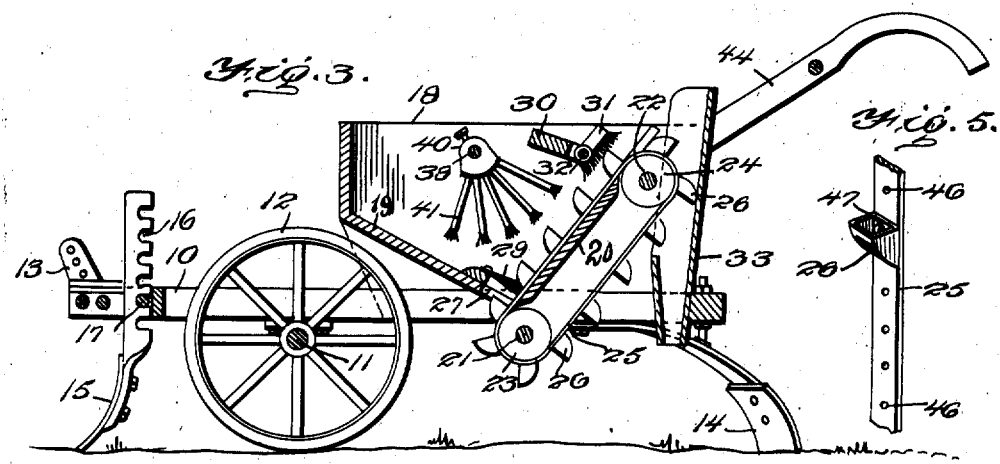
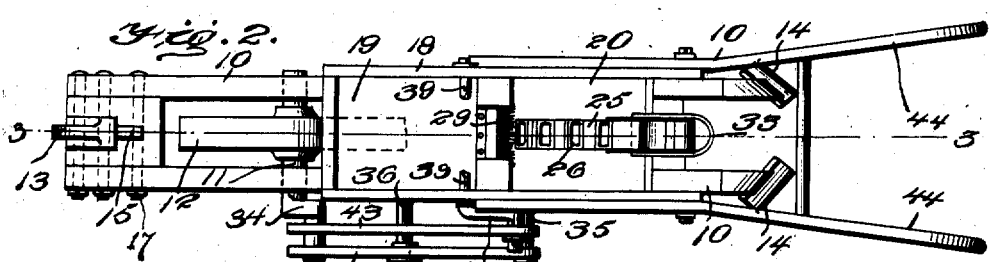
Inventor
Robert H. Prior.
Witnesses
By
A. R. Facey Attorney.

UNITED STATES PATENT OFFICE.

ROBERT H. PRIOR, OF ESOM HILL, GEORGIA.

COTTON-SEED PLANTER.

1,044,082.  Specification of Letters Patent.  Patented Nov. 12, 1912.

Application filed September 14, 1911. Serial No. 649,344.

*To all whom it may concern:*

Be it known that I, ROBERT H. PRIOR, citizen of the United States, residing at Esom Hill, in the county of Polk and State of Georgia, have invented certain new and useful Improvements in Cotton-Seed Planters, of which the following is a specification.

This invention relates to seed planters, more particularly to devices of this class employed for planting or "dropping" cotton and similar seeds, and has for one of its objects to improve the construction and increase the efficiency and utility of devices of this character.

Another object of the invention is to produce a device of this character wherein a certain predetermined quantity of seeds is deposited at certain predetermined intervals, and means provided whereby the periods of time between the droppings may be regulated and controlled.

Another object of the invention is to provide a device of this character wherein provision is made for opening a furrow, dropping a predetermined quantity of seeds at predetermined intervals, and covering the seeds after they have been deposited.

Another object of the invention is to provide a device of this character wherein provision is made for controlling the number of seeds which are deposited at each dropping action.

Another object of the invention is to provide a device of this character wherein improved means for transmitting and reversing the motion of the seed-elevating mechanism is provided.

With these and other objects in view, the invention consists in certain novel features of construction as hereafter shown and described, and then specifically pointed out in the claims, and in the drawing illustrative of the preferred embodiment of the invention: Figure 1 is a side elevation of the improved device; Fig. 2 is a plan view of the same; Fig. 3 is a section on the line 3—3 of Fig. 2; Fig. 4 is a perspective detail view illustrating a modification in the construction. Fig. 5 is a perspective detail of a portion of the elevator belt illustrating the manner of securing the buckets.

Corresponding and like parts are referred to in the following description and indicated in all the views of the accompanying drawing by the same reference characters.

The improved device comprises a supporting frame 10 carrying a driving axle or shaft 11 and a combined driving and carrier wheel 12, the wheel being preferably located centrally of the frame transversely. The frame 10 is preferably formed of two members spaced apart and converging toward their forward ends and supporting a clevis device 13 and with furrow coverers 14, at the rearwardly diverging ends of the frame members. Connected to the frame 10 near its forward end is a furrow opener represented as a whole at 15 and adapted to be adjusted vertically through the medium of a plurality of slots or recesses 16 and clamp bolt 17 whereby the depth of the furrow is controlled.

Mounted upon the frame 10 rearwardly of the wheel 12, is a seed receptacle 18 having a hopper bottom 19 and a rearwardly inclined back 20. Mounted for rotation beneath the frame 10 is a lower elevator supporting shaft 21, while a similar and upper elevator supporting shaft 22 is mounted for rotation through the receptacle 18 rearwardly of the inclined back 20. Belt pulleys 23—24 are carried respectively by the shafts 21—22 and support an endless belt 25 having small seed elevating buckets 26. The buckets move upwardly through a suitable aperture 27 in the bottom 19 of the receptacle and return rearwardly of the receptacle as shown. Connected to the bottom 19 and projecting over the aperture 27 is a brush 29 with relatively long flexible bristles which are displaced by the upwardly moving buckets and operate to prevent seeds from falling through the opening between the buckets. The brush 29 thus serves as a guard to prevent the escape of the seeds while at the same time permitting the buckets to move upwardly and displace the bristles and pick up their supply of seeds, as hereafter explained. Extending transversely of the receptacle 18 in advance of the endless bucketed belt is a block 30 having another brush 31 mounted to swing thereon at 32, the bristles of the latter brush bearing yieldably against the edges of the bucket and operating to brush off any surplus seeds which may cling thereto. This device will be found useful and important when cotton and similar seeds are being planted, as the shreds of cotton which cling to the seeds cause them to adhere slightly, but by employing the stripper brush 31 all surplus seeds which may be carried up will be brushed off so that only the quantity of seeds which are received within the buckets will be finally conducted to the dropper mechanism. Located rearwardly of the bucketed belt 25—26 is a conductor tube 33 into which the seeds drop as they are carried over the upper belt pulley 24 and are conveyed thence to the furrow and in advance of the coverers 14.

The axle 11 is provided with a crank 34 at one end, while the shaft 21 is provided with a similar crank 35 at one end. Connected to the frame 10 midway between the shafts 34—21 is a stud 36. The pins of the cranks 34—35 are coupled together by a connecting rod 37, and the rod is provided with an intermediate slot 38 through which the stud 36 passes. By this simple arrangement as the wheel 12 is rotated by contact with the ground when the seeder is moved forwardly, the rotary motion of the shaft 11 is communicated to the shaft 21, but in reverse order through the co-action of the cranks 34—35, and the slotted rod 37 and the stud 36, so that while the wheel 12 moves forwardly over the ground the bucketed belt 25—26 will move in the proper direction through the seed box.

Mounted for rotation through the seed box near its upper edge is another shaft 39 carrying a hub 40 provided with a plurality of radial fingers 41 spaced apart. The shaft 39 is provided with a relatively long crank 42 externally of the receptacle and connected by a rod 43 to the pin of the crank 34, so that the rotary motion of the crank 34 will impart an oscillatory motion to the shaft 39 and thus cause the fingers 41 to vibrate within the casing and agitate the seeds and prevent them from becoming clogged. By this simple arrangement it will be obvious that as the machine is drawn forwardly over the ground a furrow will be opened in advance of the wheel 12 and the latter will travel in the bottom of the furrow while the seeds will be dropped at predetermined intervals in the furrow rearwardly of the wheel, while the coverers 14 will restore the earth to the furrow and thus cover the seed. The furrow opening, seed depositing and covering devices are operated by one machine and by one operation.

Suitable handles 44 are connected to the receptacle 18 and extend rearwardly of the machine to enable the latter to be guided.

In Fig. 4 is shown a modification of the construction of the arm 37, which consists in substituting for the slot 38, a sleeve 45 mounted for oscillation on the pin 36 and through which the member 37 is slidably disposed, the oscillating sleeve performing the same function as the slot 38.

The buckets 26 are arranged to be adjustably disposed upon the belt 25 so that they may be spaced at a greater or lesser distance apart to increase or decrease the time between each delivery and thus control the distance between the "hills" or droppings of the seed. For the purpose of illustration the belt 25 is shown provided with a plurality of apertures 46 and each bucket is provided with a bolt 47 to pass through one of the apertures of the belt. By this means the shifting of the buckets is a simple process, and any required number of buckets may be employed and spaced at any distance apart within the range of the apertures within the belt, to control the intervals of time between which the buckets are caused to deposit their seeds.

The improved device is simple in construction, can be inexpensively manufactured and of any capacity, and adapted without material structural changes to seeds of various kinds, but as before stated, is designed more particularly for planting cotton seeds.

Having thus described the invention, what is claimed as new is:

1. In an apparatus of the class described, a seed receptacle having an opening in its bottom and a lower brush extending partly over said opening, an endless belt conveyer including spaced buckets and operating through the aperture in said receptacle and in engagement with said lower brush, a support extending transversely within said receptacle, an upper brush including a head member swingingly connected at one edge to said support and movably bearing by its bristles against the buckets of the endless belt.

2. In an apparatus of the class described, a supporting frame, an axle supported on said frame and having a crank, a bearing wheel carried by said axle, a seed receptacle carried by said frame, a lower shaft having a crank and a belt pulley, an upper shaft having a belt pulley and through said seed receptacle, a plurality of buckets carried by said bolt, a seed spout for receiving the seed from said buckets, a stud extending from said frame, a rod pivoted at its ends to said axle crank and to said conveyer shaft crank, and means for swingingly and slidably coupling said rod to said stud.

3. In an apparatus of the class described, a seed receptacle having an opening in its bottom, an endless conveyer including a plurality of buckets spaced apart and operating through the opening in said receptacle, a discharge spout arranged to receive the seed from said buckets, a brush projecting over said aperture and through the bristles of which said buckets pass, and another brush mounted to swing within said receptacle near the top thereof and against which the buckets are moved just before they are discharged.

In testimony whereof I affix my signature in presence of two witnesses.

ROBERT H. PRIOR. [L. S.]

Witnesses:
J. E. DEMPSEY,
D. L. ROBERTS.

---

It is hereby certified that in Letters Patent No. 1,044,082, granted November 12, 1912, upon the application of Robert H. Prior, of Esom Hill, Georgia, for an improvement in "Cotton-Seed Planters," errors appear in the printed specification requiring correction as follows: Page 2, line 118, after the word "pulley" insert a comma and the words *an endless belt leading over said belt pulleys;* and same page, line 120, for the word "bolt" read *belt;* and that the said Letters Patent should be read with these corrections therein that the same may conform to the record of the case in the Patent Office.

Signed and sealed this 21st day of January, A. D., 1913.

[SEAL.]

C. C. BILLINGS,

*Acting Commissioner of Patents.* rality of buckets spaced apart and operating through the opening in said receptacle, a discharge spout arranged to receive the seed from said buckets, a brush projecting over said aperture and through the bristles of which said buckets pass, and another brush mounted to swing within said receptacle near the top thereof and against which the buckets are moved just before they are discharged.

In testimony whereof I affix my signature in presence of two witnesses.

ROBERT H. PRIOR. [L. S.]

Witnesses:
J. E. DEMPSEY,
D. L. ROBERTS.

---

It is hereby certified that in Letters Patent No. 1,044,082, granted November 12, 1912, upon the application of Robert H. Prior, of Esom Hill, Georgia, for an improvement in "Cotton-Seed Planters," errors appear in the printed specification requiring correction as follows: Page 2, line 118, after the word "pulley" insert a comma and the words *an endless belt leading over said belt pulleys;* and same page, line 120, for the word "bolt" read *belt;* and that the said Letters Patent should be read with these corrections therein that the same may conform to the record of the case in the Patent Office.

Signed and sealed this 21st day of January, A. D., 1913.

[SEAL.]

C. C. BILLINGS,

*Acting Commissioner of Patents.*

It is hereby certified that in Letters Patent No. 1,044,082, granted November 12, 1912, upon the application of Robert H. Prior, of Esom Hill, Georgia, for an improvement in "Cotton-Seed Planters," errors appear in the printed specification requiring correction as follows: Page 2, line 118, after the word "pulley" insert a comma and the words *an endless belt leading over said belt pulleys;* and same page, line 120, for the word "bolt" read *belt;* and that the said Letters Patent should be read with these corrections therein that the same may conform to the record of the case in the Patent Office.

Signed and sealed this 21st day of January, A. D., 1913.

[SEAL.]                      C. C. BILLINGS,

*Acting Commissioner of Patents.*